United States Patent [19]

Moreno

[11] 4,428,439

[45] Jan. 31, 1984

[54] ADJUSTABLE, PORTABLE, HAND-HELD IMPACTOR

[75] Inventor: Jack Moreno, Bethel, Conn.

[73] Assignee: Blackstone Industries, Inc., Bethel, Conn.

[21] Appl. No.: 340,190

[22] Filed: Jan. 18, 1982

[51] Int. Cl.[3] .............................................. B23B 45/16

[52] U.S. Cl. .................................... 173/118; 173/119; 173/123; 74/56

[58] Field of Search ............... 173/119, 123, 118, 122; 74/53, 54, 55, 56, 57; 175/298, 299

[56] References Cited

U.S. PATENT DOCUMENTS

| | | | |
|---|---|---|---|
| 1,825,072 | 9/1931 | Keller | 173/123 X |
| 2,657,383 | 11/1953 | Siering et al. | 173/123 X |
| 3,107,083 | 10/1963 | Penthers | 173/123 X |
| 4,082,151 | 4/1978 | Finney | 173/123 X |

*Primary Examiner*—James M. Meister
*Assistant Examiner*—Willmon Fridie, Jr.
*Attorney, Agent, or Firm*—Mattern, Ware, Stoltz & Fressola

[57] ABSTRACT

By providing an inexpensive, easily manufactured coil spring member as a cam surface which is spring biased and is controllably, reciprocatingly axially cycled by a rotating cam follower, an inexpensive, continuous operable, fail-safe, dependable, portable, impactor handpiece is achieved. In the preferred embodiment, the portable, hand-held impacting tool of the present invention also incorporates an inexpensively manufactured and easily installed key member retainingly engaged in an axially elongated slot to prevent unwanted rotation of the anvil member, while assuring continuous, trouble-free reciprocating axial movement thereof.

11 Claims, 5 Drawing Figures

23
24
44
20
43
42
41
40
22

52
42
51
38
50
25
42
41
39
60
20
37
26
35
57
56
36
55
33
57
41
32
34
48
31
49
47
55
32
30
47
40
22

38
25
72
39
71
70
37

ADJUSTABLE, PORTABLE, HAND-HELD IMPACTOR

TECHNICAL FIELD

This invention relates to portable, hand-holdable impacting tools and more particularly to adjustable impacting tools.

BACKGROUND ART

Hand-holdable impacting tools of the same general character as the present invention are well-known and are presently widely used in various fields. Typically, these impacting handpiece tools are employed for providing repeated hammering to a particular work piece, such as required in the jewelry and electronics field for light riviting, peening, stone setting, etc., as well as for providing controlled, repeated tamping of material such as an amalgam, as employed by dentists in the filling of cavities.

Although portable, hand-holdable impacting tools have been widely used, these prior art impacting tools are expensive to manufacture and are generally incapable of inexpensive mass production. These deficiencies are due to the precision manufacturing requirements imposed upon various components of these prior art tools.

All impacting tools incorporate a system which converts rotary motion into axial motion, and generally comprise the same basic construction. Typically, the rotary motion is provided by an elongated, flexible, shielded cable which incorporates a central rotating shaft member, similar to the cables employed in speedometers.

The shielded cable is securely mounted within the housing of the impacting tool, and drivingly connected to a cam follower mounted to the distal end of an internal rotating spindle. The cam follower is positioned in abutting sliding frictional contact with a substantially helical cam surface, which is formed on an axially movable cam member. The cam member is spring loaded for its axial movement in one direction, with the cam follower's movement along the cam surface forcing the cam member in the opposite direction.

The cam surface incorporates a sloped or ramped portion which causes the cam follower to move the cam member against the spring force and then, when the cam follower reaches the end of the cam's ramped zone, the spring forces the cam member in the opposite axial direction. This forward and backward axial motion is continuously repeated, causing the operating end of the impacting tool to move in the same manner. Since the rotating cam follower and spindle continuously and rapidly rotate about their axis of rotation, the operating end of the impacting tool achieves a plurality of rapid forward and rearward cycles, attaining the desired repeated, continuous hammer-like impacts on the workpiece.

Although many alternate structures have been developed for portable, hand-holdable, impacting tools, all of these constructions have suffered from the consistent use of expensive cam surfaces which must be manufactured with very precise slope requirements within stringent tolerances. As a result, this particular component part is extremely difficult to fabricate and, consequently, extremely expensive.

In addition, some of these prior art impacting tools suffer from the lack of some means to prevent the cam member and its associated anvil member from rotating due to the rotational motion induced by the cam follower. Rotation of the anvil and cam surface is undesirable, since it causes the cycling pattern of the anvil tip to change repeatedly or, possibly, never occur.

Some prior art devices do incorporate means for preventing this rotation. However, such anti-rotation means generally comprise pin members which require expensive machining of both the pin as well as the pin-receiving hole, thereby substantially increasing the cost of the impacting tool.

Consequently, it is the principle object of the present invention to provide a portable, hand-holdable impacting tool which incorporates an inexpensively produced and easily installed spring loaded cam surface.

Another object of the present invention is to provide a portable, hand-holdable impacting tool having the characteristic features described above which also incorporates an anti-rotation system cooperatively associated with the anvil which is inexpensively manufactured and quickly and easily installed.

Another object of the present invention is to provide a portable, hand-holdable impacting tool having the characteristic features described above which is inexpensively manufactured and provides fail-safe, dependable, and continuous operation.

Other and more specific objects will in part be obvious and will in part appear hereinafter.

DISCLOSURE OF THE INVENTION

In the impactor handpiece of the present invention, these prior art failings are completely eliminated by employing inexpensive, easily produced components which can be quickly and easily installed in position, attaining an inexpensively manufactured and easily assembled impacting tool. In addition, removal and replacement of these components is achieved with simplicity and ease.

In the present invention, the prior art expensive, machined cam surfaces are completely eliminating by employing the end of a helical coiled spring member as the cam surface. The spring cam member employed in the impactor of the present invention has its plurality of helical coils at a sloping, ramped, continuous incline which is dimensioned to provide the desired camming action. In addition, the end surface of the coiled spring member which serves as the cam surface has the terminating end of the spring cut substantially perpendicular to the outer peripheral cam surface. Consequently, when installed in position, the helical, ramped, sloping coiled spring member provides a cam surface having the required continuous, smooth sloping, ramped surface and the abrupt, rapid transition zone from the ramp's high point to its low point.

In addition, the present invention also incorporates a new, simple, inexpensive, and easily installed anti-rotation system which prevents the unwanted rotation of the anvil member and eliminates the need for expensive manufacturing or expensively produced components. This rotation preventing system incorporates a U-shaped key member simply and easily mounted to the anvil in receiving holes, and operationally positioned within a stationary, axially elongated slot. In this way, the key member is free to move axially with the anvil, but prevents rotation of the anvil due to the abuttment of the key member against the walls of the axially elongated slot.

In the preferred embodiment, the key member comprises spring steel wire formed in a U-shape which is securely mounted to the anvil in two holes formed therein to receive the ends of the U-shaped key member. However, any alternative construction or shape could be employed without departing from the scope of this invention.

The present invention attains an impactor handpiece which is inexpensive to produce, and provides the quality and desirable characteristics sought by users. The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

BEST MODE FOR CARRYING OUT THE INVENTION

Figures 1, 2, 3:
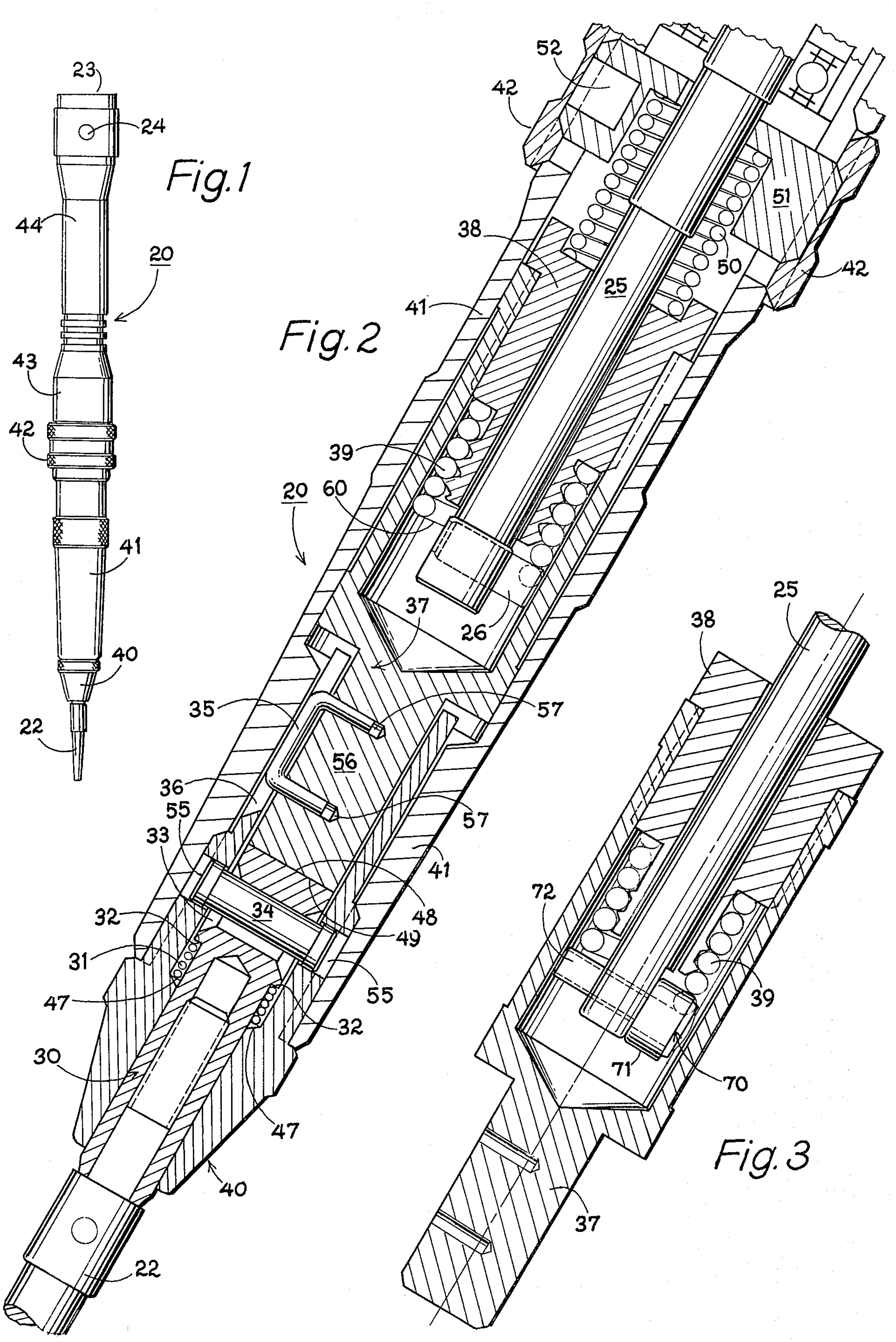
FIG. 1 is an elevation view of the impactor handpiece of the present invention.
FIG. 2 is an enlarged, cross sectional view, partially broken away, of the impactor handpiece of the present invention.
FIG. 3 is an enlarged cross sectional view, partially broken away, showing an alternate embodiment of one portion of the impactor handpiece of the present invention.

As shown in FIG. 1, portable, impactor handpiece 20 of the present invention comprises an elongated, substantially cylindrical shape which is designed for being lightweight and comfortably held in the hand of the operator, with the adjustable portions readily accessible. The outer peripheral surface of impactor 20 comprises a nosepiece 40, a sheath 41, an adjustment ring 42, a connector 43, and a rear housing 44. These components form the overall, hand-holdable housing of impactor 20, with an anvil point 22 extending from nosepiece 40 to form the operative end of impactor 20. In order to achieve the desired repeated hammering or impinging effect upon a particular workpiece, anvil point 22 reciprocatingly cycles forwardly and rearwardly along its central axis.

Construction

The physical construction of impacting tool 20 of the present invention can best be understood by referring to FIGS. 1, 2, 4 and 5, along with the following detailed description. Throughout this description, the components forming impactor 20 are desired with all references to the proximal end of the component being towards anvil point 22 and all references to the distal end of the component being towards the rear end of impactor 20.

The proximal end of impactor 20 incorporates anvil point 22 which is removably secured to impactor 20 by threadedly engaging the distal end of anvil point 22 with a plunger 30 positioned within impactor 20. As shown in FIG. 2, plunger 30 is peripherally surrounded by nosepiece 40 and is dimensioned for axial sliding engagement therein. In addition to incorporating a threaded anvil point-receiving and securing zone, plunger 30 also incorporates a ledge 32 surrounding its outer peripheral surface, an enlarged pin receiving hole 33 extending through plunger 30 substantially transverse to the central axis thereof, and a substantially flat impact receiving surface 48 forming the distal end of plunger 30.

Nosepiece 40 incorporates a pin securing hole 55 extending through nosepiece 40, substantially perpendicularly to the central axis of nosepiece 40. During installation, enlarged pin receiving hole 33 of plunger 30 is aligned with pin holding hole 55 of nosepiece 40, and a pin 34 is simultaneously inserted into both holes 33 and 55. Preferably, pin holding hole 55 of nosepiece 40 comprises a diameter substantially equal to the diameter of the terminating ends of pin 34, in order to hold pin 34 in position, free from axial movement. Furthermore, in order to assure secure retention of pin 34 in position within enlarged hole 33 of plunger 30, sheath 41 is threadedly engaged with nosepiece 40 so that the proximal end of sheath 41 overlies pin securing hole 55 of nosepiece 40. In this way, any accidental dislodgement of pin 34 is prevented.

When pin 34 is securely retained in its desired position within enlarged pin receiving hole 33 of plunger 30, the axial movement of plunger 30 is limited to the dimensional difference between the diameter of enlarged hole 33 and the diameter of pin 34. As clearly shown in FIG. 2, plunger 30 is incapable of moving past pin 34 and, consequently, plunger 30 moves axially between abutting contact of the distal surface of hole 33 with pin 34 to abutting contact between the proximal surface of hole 33 with pin 34.

Since anvil point 22 is threadedly engaged with plunger 30, the limited axial travel distance of plunger 30 also controls the total axial distance anvil point 22 is capable of moving. Typically, plunger 30 and anvil point 22 have a maximum axial travel distance of about 3/32 inches.

Nosepiece 40 also incorporates a ledge 47 positioned in juxtaposed spaced cooperating relationship with ledge 32 of plunger 30, with a coil spring 31 positioned between ledges 32 and 47. The axial movement of plunger 30 from its rearward to its forward position causes coil spring 41 to be compressed, since ledge 32 advances towards ledge 47, compressing spring 31 therebetween.

As is more fully defined below, this forward axial movement of plunger 30 is caused when a hammering force is exerted upon substantially flat distal surface 48 of plunger 30. Since coil spring 31 is under compression when plunger 30 advances forwardly along its vertical axis, the elimination of this forward movement producing force caused coil spring 31 to push against flange 32 of plunger 30 and physically move plunger 30 towards the distal end of impactor 20, until plunger 30 has reached its rearward most axial travel distance.

Figure 4:
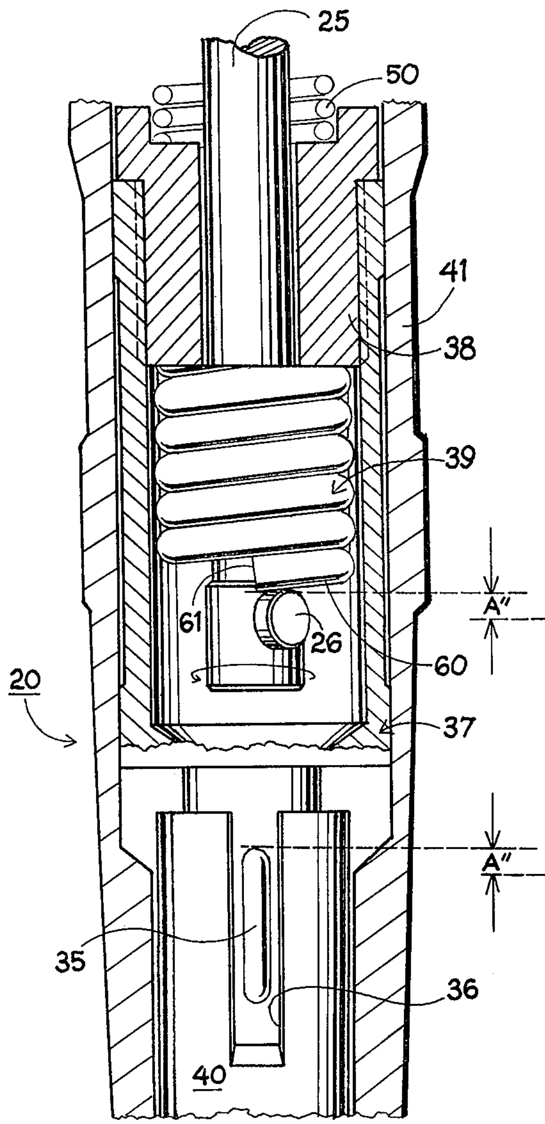
FIGS. 4 and 5 are enlarged cross sectional views, partially broken away, showing different stages in the operation of the impactor handpiece of the present invention.
Figure 5:
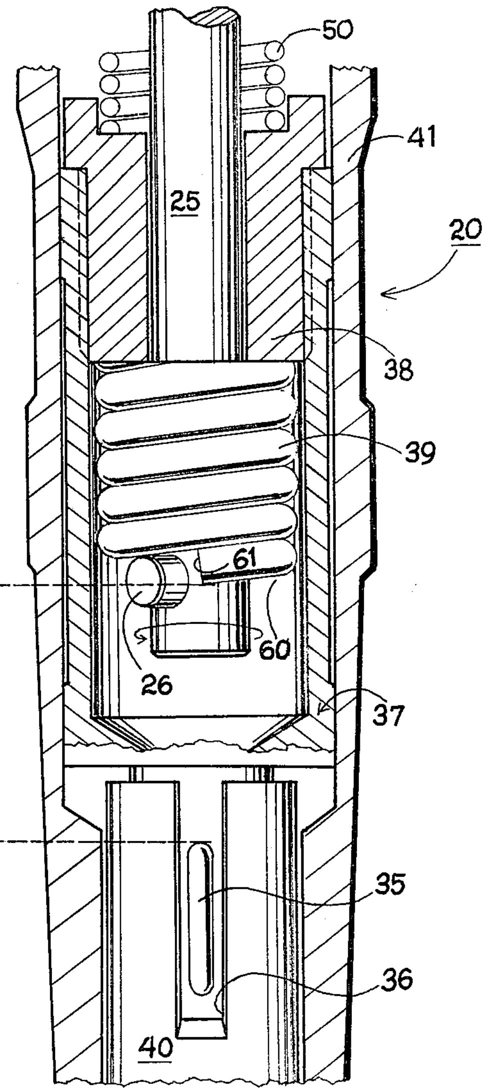

The hammering or movement producing force, which is exerted upon distal surface 48 of plunger 30 and which causes plunger and anvil point 22 to move axially forwardly and produce the desired hammering or tamping effect upon the workpiece, is produced by the axial movement of anvil 37, spring cam member 39, and cam holder 38. As shown in FIGS. 2, 4 and 5, coil-spring cam member 39 is securely mounted to cam holder 38, and cam holder 38 is threadedly engaged with anvil 37.

Anvil 37 is housed within sheath 41 in axial sliding engagement therewith. In addition, anvil 37 incorporates a forwardly extending finger portion 56 forming the proximal end of anvil portion 37, which portion is slidingly engaged with the distal end of nose portion 40. Forwardly extending finger portion 56 incorporates a substantially flat surface 49 forming the proximal end of anvil 37 and two substantially parallel pin receiving holes 57 formed in one side of portion 56 substantially perpendicularly to the central axis thereof. As is more fully explained below, holes 57 are constructed for allowing rotation preventing key member 38 to be quickly and easily securely mounted therein, which assures that anvil 37 moves axially and prevents unwanted rotational movement of anvil 37. In the preferred embodiment key member 38 comprises a U-shaped member manufactured from steel wire, which is quickly and easily secured in receiving holes 57 of anvil 37. In this way, an inexpensive and high effective rotation preventing system is attained, which is easily manufactured and assembled.

As best seen in FIGS. 4 and 5, nose portion 40 incorporates an axially elongated slot 36 formed in its distal end. Rotation preventing key member 35 is positioned within axially elongated slot 36 of nose portion 40, for axial movement therein. However, inasmuch as the width of axially elongated slot 36 of nose portion 40 is slightly greater than the diameter of key member 35 and key member 35 is surrounded by slot 36, abutting contact between key member 35 and the walls of slot 36 prevent anvil 37 and its forwardly extending finger portion 56 from rotating about the central axis thereof. As a result, the movement of anvil 37 is controlled and assurance provided that anvil member 37 will move only axially forwardly and rearwardly within peripherally surrounding sheath 41.

In the preferred embodiment spring cam member 39 comprises an inexpensively produced helical coil spring having a wire thickness and a slope angle provides a sloping, stepped, fixed pitch cam surface at a very modest cost. Using spring cam member 39 of the present invention, the identical forward and rearward reciprocating axial movement found in prior art systems is achieved in a dependable, fail-safe construction which is substantially less expensive to produce, assemble and maintain.

Preferably, the helical coils of spring cam member 39 are not tightly abutting each other prior to being installed on cam holder 38, whose outside diameter is equal to or slightly greater than the inside diameter of spring 39. In this way, spring cam member 39 is more easily securely mounted to cam holder 38 with each coil thereof tightly wound about holder 38. As a result, unwanted slippage or movement of spring cam member 39 is prevented and continuous, trouble-free operation is assured.

An additional advantage of the present invention is that spring cam member 39 is quickly and easily replacable. Consequently, if for any reason a new spring cam member is desired, removal and replacement thereof is quickly and easily achieved without requiring expensive hardware, fixtures or replacement parts.

The forward force producing subassembly is completed by an impact adjustment ring 42, a spring retaining nut 51, and a coil spring 50 which is mounted between the distal end of cam holder 38 and retaining nut 51. This entire subassembly is positioned in cooperative association with an elongated spindle 25, which is securely mounted along the central axis of impactor 20 with the spring cam member 39, spring holder 38, coil spring 50, and spring retaining nut 51 all mounted about spingle 25 substantially concentrically therewith.

Spindle 25 is securely mounted within impactor 20 for rotational movement only, with cam follower 26 securely mounted thereto and extending therefrom substantially perpendicularly to the central axis of spindle 25. The distal surface of cam follower 26 is in sliding frictional engagement with the proximal cam surface 60 of spring cam member 39, with biassing coil spring 50 maintaining cam surface 60 of spring cam member 39 in sliding frictional engagement with cam follower 26.

Impact adjustment ring 42 is threadedly engaged with spring retaining nut 51 for adjustably, controlled axially movement of spring retaining nut 51 either forwardly or rearwardly. Since retaining nut 51 is in contact with spring 50, the axial movement of nut 51 changes the compressive force of spring 50 and, consequently, the force with which cam surface 60 of spring cam member 39 is in contact with cam follower 26.

Spring retaining nut 51 also incorporates a friction enhancing plug 52 securely mounted in a portion of the outer peripheral surface of nut 51. As shown in FIG. 2, friction plug 52 is mounted in the outer peripheral surface of nut 51 to maintain frictional contact with adjustment ring 42. In this way, the increased tractive contact between plug 52 and adjustment ring 42 prevents any accidental, unwanted rotation of ring 42. In the preferred embodiment, friction plug 52 comprises nylon manufactured as a simple insert which is quickly and easily installed in an accomodating recess or hole formed in nut 51.

Operation

By referring to FIGS. 2, 4 and 5, the operation of impactor 20 can best be understood. As discussed above, spindle 25 is mounted within impactor 20 for rotational movement only, and is incapable of moving axially. Consequently, cam follower pin 26, which extends from spindle 25 substantially perpendicularly to the central axis of spindle 25, rotates about the central axis of spindle 25 repeatedly defining the same circular arc of rotation.

The rotational movement of spindle 25 is achieved in the conventional manner, well known in the art, employing a conventional shielded cable which incorporates a central shaft member which continuously rotates about its central axis in response to driving means, also well known in the art. In order to operate impactor 20, the shielded cable is inserted into impactor 20 through rear portal 23, shown in FIG. 1, and is securely locked in this position by spring biassed ball detent 24. The terminating end of the rotating shaft of the shielded cable typically incorporates a rectangular shaped which is drivingly engaged with spindle 25, thereby causing spindle 25 to rotate about its central axis in response to the rotation of the shaft of the shielded cable.

As spindle 25 rotates, with cam follower 26 repeatedly rotating through a single circular path, coil spring cam member 39 is maintained in sliding frictional contact with cam follower 26. The continuous sliding engagement of spring cam member 39 with cam follower 26 is maintained and assured by biassing spring member 50, which is maintained under compression against axially movable spring cam holder 38.

As best seen in FIGS. 4 and 5, the proximal surface of spring cam member 39 comprises the desired sloping ramped cam surface 60 with the terminating end 61 of spring cam member 39 forming the short, rapid change between the low and high points of the ramped surface.

As cam follower 26 rotates about the central axis of spindle 25 repeatedly defining the same circular path, anvil 37, threadedly engaged cam holder 38 and spring cam member 39 continuously cycle forwardly and rearwardly along their concentric central axis, while cam surface 60 of spring cam member 39 is maintained in sliding contact with cam follower 26. Since cam follower 26 is axially stationary, the movement of cam follower 26 through a single cycle along cam surface 60 of spring cam member 39 causes anvil 37, cam holder 38 and spring cam member 39 to move rearwardly at a substantially constant speed as cam follower 26 advances along the sloping, ramped cam surface 60 towards terminating end 61 and, then, quickly advance forwardly and forcefully as cam follower 26 moves across terminating end 61, allowing spring 50 to propel cam holder 38, spring cam member 39 and anvil 37 forwardly. This cycle of comparative slow rearward movement and rapid forward movement is repeated continuously as long as spindle 25 rotates, thereby producing the desired reciprocating axial motion.

In FIG. 4, the rearwardmost position of anvil 37, cam holder 38, and spring cam member 39 is shown. In this position, cam follower 26 has advanced along sloping, ramped cam surface 60 of spring cam member 39 and has almost reached terminating end 61 of spring cam member 39. When this position has been reached, biassing spring 50 is placed under maximum compression for that particular spring adjustment setting.

As cam follower 26 continues to rotate through its circular path, moving across the plane within which terminating end 61 is located, the stored compression force of biassing spring 50 is released and biassing spring 50 forces cam holder 38, anvil 37, and spring cam member 39 to rapidly advance axially forwardly until camming surface 60 of spring cam member 39 is brought into sliding frictional engagement with cam follower 26 as shown in FIG. 5. In this position, anvil 37, cam holder 38 and spring cam member 39 have moved axially forwardly through their maximum travel distance, and a new cycle begins with these components reversing direction and moving rearwardly again. In FIGS. 4 and 5, this maximum axial travel distance through which anvil 37, cam holder 38, and spring cam member 39 are capable of moving in any one direction is shown as distance "A".

Due to the compression force stored by coil spring 50, this forward axially movement is achieved quickly and forcefully. As a direct result of this forward movement, substantially flat proximal surface 49 of anvil 37 comes into force transmitting contact with substantially flat distal surface 48 of plunger 30, causing plunger 30 and anvil point 22 to simultaneously move axially forwardly towards the workpiece, with the substantially same rapid, forceful impact. Then, as cam follower 26 continues to rotate, causing anvil 37, cam holder 38, and spring cam member 39 to move rearwardly, anvil point 22 and plunger 30 simultaneously move rearwardly due to the forces stored in coil spring 31. This rearward movement continues until a new cycle is begun causing anvil 37, cam holder 38 and spring cam member 39 to move forward rapidly, driving anvil point 22 and plunger 30 forward simultaneously.

It is this repeated reciprocating forward and rearward movement which produces the desired hammering effect. As with prior art impactors, impactor 20 of the present invention reciprocatingly cycles forwardly and rearwardly between 5,000 and 10,000 times per minute, achieving the desired hammering or impinging effect on the workpiece.

As spindle 25 and cam follower 26 continuously rotate about the central axis of spindle 25 along cam surface 60 of spring cam member 39, the sliding frictional contact of cam follower 26 on cam surface 60 imparts a rotational component of force to spring cam member 39. If this rotational component of force were not opposed, anvil 37, cam holder 38, and spring cam member 39 would rotate about their central axis as well as moving axially forwardly and rearwardly. However, rotational movement of these components is undesirable, since it reduces the dependability and repeatability of the desired reciprocating, axial movement of these components.

Consequently, in order to eliminate this unwanted rotational movement of anvil 37, cam holder 38, and spring cam member 39, rotation preventing key member 35 is securely positioned in anvil 37 and cooperatively associated with slot 36 of nose portion 40. As discussed above, U-shaped rotation preventing key member 35 is capable of axial movement forwardly and rearwardly within elongated, axially extending slot 36. However, if any rotational movement is imparted to anvil 37, key member 35 will come into abutting contact with one side of elongated slot 36, thereby preventing any further rotational movement of anvil 37. Consequently, key member 35 and cooperatively associated elongated slot 36 prevent anvil 37, cam holder 38, and spring cam member 39 from rotating about their concentric axis, assuring the desired, repeated, reciprocating forward and rearward movement of these components.

Although prior art impactors have employed various cooperating surfaces in an attempt to reduce or eliminate unwanted rotational movement, no prior art system has ever attained a rotation preventing construction which is inexpensive to manufacture and quickly and easily assembled, without fear of any degradation or component failure during use. As a result, a simple, inexpensive, effective and reliable rotation preventing system is achieved.

In FIG. 3, an alternate embodiment for the cam follower affixed to spindle 25 is shown. In this embodiment, anvil 37, cam holder 38, and spring cam member 39 are all identical to the construction discussed above. However, instead of having a simple pin member perpendicularly extending from the central axis of spindle 25, as described above in reference to cam follower 26, this alternate embodiment employs a cam follower 70 which incorporates a roller 71 rotationally mounted to a supporting stud shaft 72.

With this construction, the overall operation of impactor 20 of the present invention is substantially identical to the operation discussed above. However, by employing cam follower 70 with roller member 71 rotationally journaled to supporting shaft 72, any undesirable sliding frictional contact between the cam follower and spring cam member 39 is minimized and smooth continuous, reciprocating axial movement is assured.

It will thus be seen that the object set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A hand-holdable impacting tool for receiving externally generated torque and generating reciprocating axial hammering motion at the tool tip, said tool comprising:

A. an outer housing,

B. an elongated spindle mounted within the housing for rotational movement, responsive to the externally generated torque delivered to said housing;

C. a cam follower rigidly mounted to the spindle and extending therefrom substantially perpendicularly to the central axis of the spindle;

D. a cam member comprising a helical coil spring a. mounted in the housing for axial sliding movement relative thereto, with biassing means producing a force acting upon the cam member to produce movement in a first axial direction, b. having a central axis substantially concentric with the central axis of the spindle, c. having a cam surface formed from one end coil of the coil spring, and comprising 1. a substantially smooth, continuous, ramped sloping surface extending to the terminating end of the coil spring, and 2. a substantialy flat surface forming the terminating end of the coil spring, providing an abrupt transition from the high point of the ramped, sloping surface to the low point thereof, and d. having the cam surface in sliding frictional engagement with the cam follower with movement of the cam follower on the cam surface causing said cam member to move in the opposed, second axial direction; and E. an anvil tip a. mounted in and extending from the housing and axially movable relative thereto, and b. operatively connected to be impelled by the axial movement of the cam member in at least one of its directions, whereby the rotational movement of the cam follower on the biassed coil spring cam member causes the cam member to move axially forwardly and rearwardly in a continuous, reciprocating manner which is cooperatively associated with the movement of the anvil tip to produce the desired reciprocating hammering effect.

2. The hand-holdable impacting tool defined in claim 1, wherein said tool further comprises:

F. an anvil a. mounted within the housing for axial, sliding movement relative thereto, and b. having a central axis substantially concentric with the central axis of the spindle, and c. incorporating a cam member holding portion, positioned peripherally surrounding the spindle and axially movable relative thereto, whereby the axial reciprocating movement of the cam member also directly controls the movement of the anvil.

3. The hand-holdable impacting tool defined in claim 2, wherein the anvil is further defined as incorporating a separate, independent cam holding portion 1. peripherally surrounding the spindle, 2. having a central axis substantially concentric with the central axis of the spindle, and 3. is threadedly engaged with the anvil to assure controlled movement thereof.

4. The hand-holdable impacting tool defined in claim 2, wherein said anvil comprises a forwardly extending portion incorporating a key receiving zone and said hand-holdable impacting tool comprises:

G. an elongated, axially extending slot formed therein and positioned in justaposed aligned cooperating relationship with the key receiving zone of said protruding portion of the anvil, and H. a rotation preventing key member securely mounted in the key receiving zone of the anvil portion, contained within said elongated, axially extending slot, whereby rotational movement of said anvil member about its central axis is prevented by said key member and elongated slot, while axial, reciprocating motion of said key member within the axially elongated slot is permitted.

5. The hand-holdable impacting tool defined in claim 2, wherein said housing is further defined as comprising a. an elongated, substantially cylindrical sheath portion, and b. a nose member 1. interlockingly engageable with one end of the sheath portion, and 2. having a portion extending into said sheath portion and incorporating an axially elongated slot, and said anvil is further defined as comprising d. a finger portion 1. extending into the elongated slot containing portion of the nose member, and 2. incorporating a rotation preventing key member securely mounted therein and positioned within the axially elongated slot of said extension portion, providing free axial movement of said anvil relative to the nose member, while preventing rotation of the anvil about its central axis relative to the nose member.

6. The hand-holdable impacting tool defined in claim 5, wherein said rotation preventing key member is further defined as comprising a substantially U-shaped pin mounted within two cooperating, pin receiving holes formed in the nose portion of the anvil.

7. The hand-holdable impacting tool defined in claim 1, wherein said tool comprises F. a biassing coil spring member mounted in operative, biassing engagement with said cam member to provide the biassing force upon said cam member to produce axial movement of the cam member in the first axial direction.

8. The hand-holdable impacting tool defined in claim 7, wherein said tool further comprises a biassing force adjustment assembly incorporating a. a biassing spring holding member 1. mounted within said housing for controlled axial movement therein, and 2. controllably retainingly engaged with one end of the cam member biassing spring, b. an adjustable ring controllably connected to said spring holding member for axial movement thereof to produce an increase or decrease in the compression force of said biassing spring, and c. friction producing means positioned between the adjustable ring and the spring holding member to increase the frictional forces therebetween, assuring secure retention of the adjustable ring in any particular position, while also providing for said friction forces to be overcome by the application of sufficient adjustment forces.

9. The hand-holdable impacting tool defined in claim 8, wherein said spring holding member comprises a recess zone formed in its outer peripheral surface and said friction producing means comprises a nylon insert member securely retained in the recess zone of the holding member.

10. The hand-holdable impacting tool defind in claim 1, wherein said cam follower is defined as comprising a pin perpendicularly mounted to one end of said spindle member and extending therefrom for direct sliding frictional engagement with said cam member.

11. The hand-holdable impacting tool defined in claim 8, wherein the cam follower is further defined as comprising roller means mounted to said pin member with said roller means being in contact with the cam member for rolling engagement therewith.

* * * * *